Patented Feb. 4, 1947

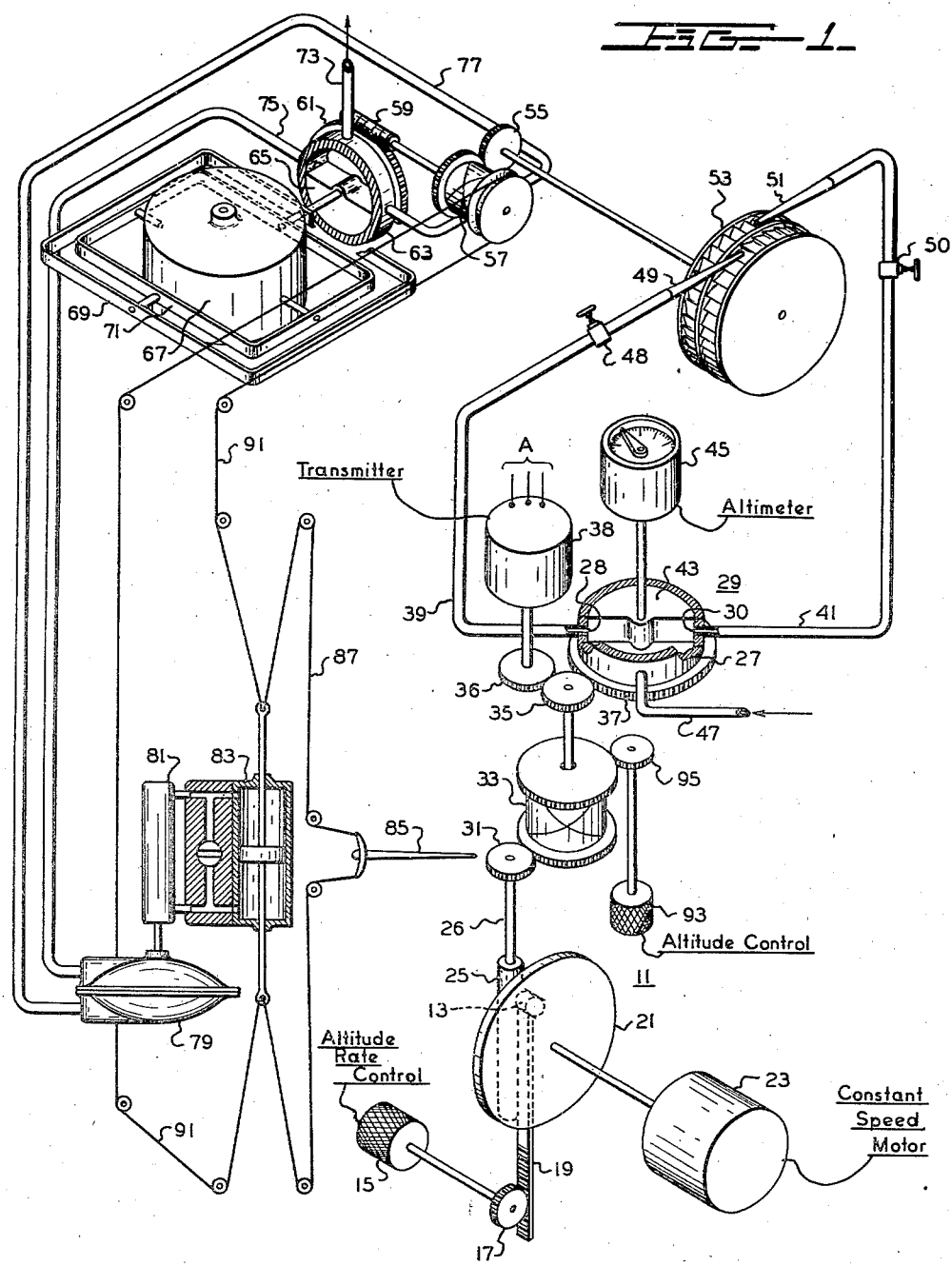

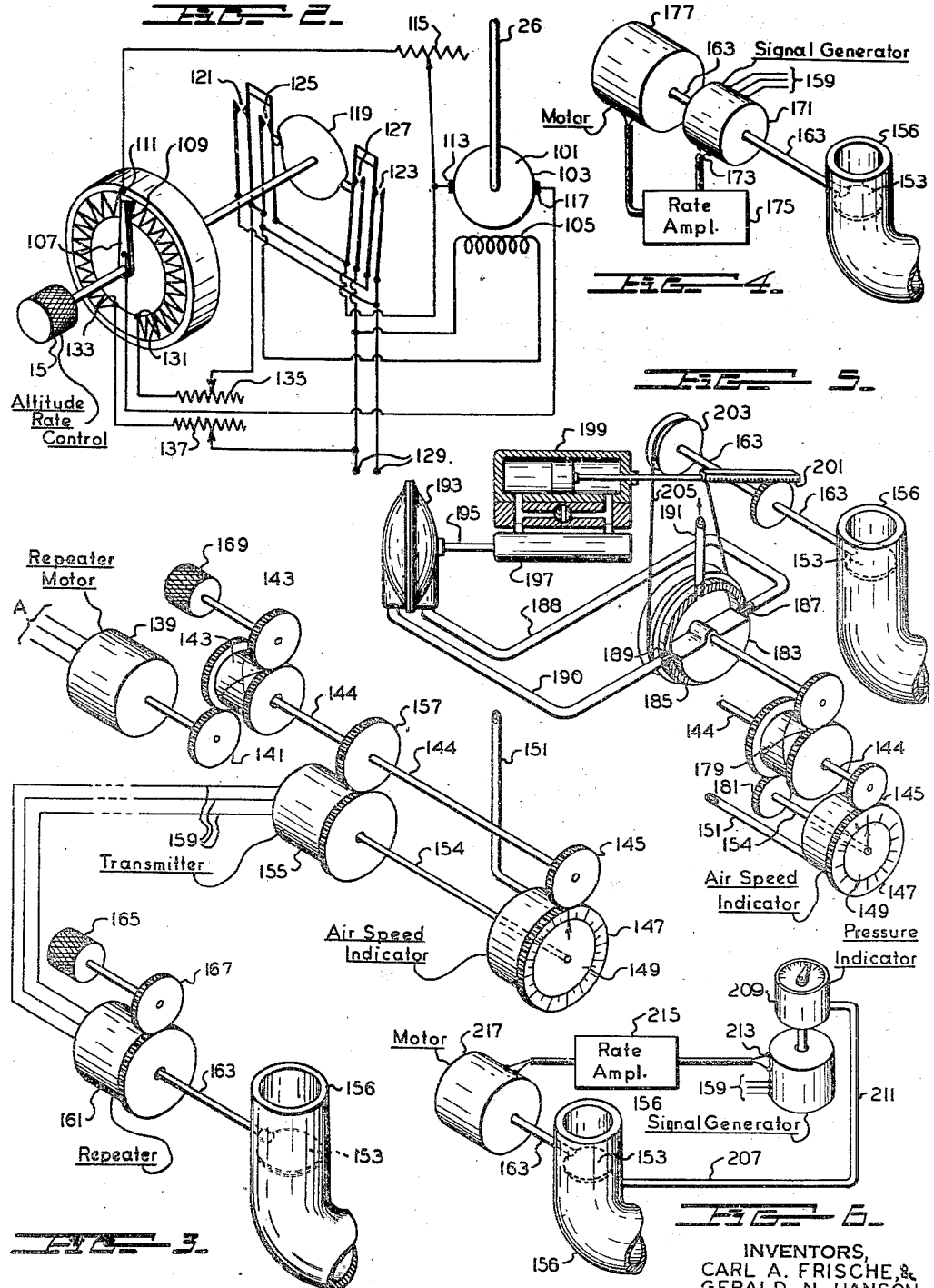

2,415,092

UNITED STATES PATENT OFFICE 2,415,092

ALTITUDE CONTROL FOR AIRCRAFT

Carl A. Frische, Leonia, and Gerald N. Hanson, Allendale, N. J., assignors to Sperry Gyroscope Company, Inc., Brooklyn, N. Y., a corporation of New York Application February 6, 1942, Serial No. 429,754

13 Claims. (Cl. 244—78)

This invention relates to automatic pilots for aircraft and more particularly to the automatic control of altitude of aircraft.

The present invention is a continuation in part of prior copending application Ser. No. 269,838, now Patent No. 2,410,058, for Automatic climb and glide control for aircraft, dated October 29, 1946.

The present invention is directed chiefly toward providing a climb or glide control of aircraft which may be controlled from a remote position. In addition, there is provided means for maintaining constant airspeed during climb or glide by varying the throttle opening in the engine intake manifold, greater throttle opening being required during climb and a lesser opening during glide than is required for level flight.

A further adjustment required is that of the airspeed meter indication. The reading of the usual instrument of this type must be corrected for air density and hence compensation must be applied during a climb or glide to offset the change of density with change of altitude. Heretofore, these tedious adjustments have had to be made manually by the pilot, serving to direct his attention away from other duties. In the present invention we effect the required adjustments automatically in accordance with the angle of climb or glide set into the automatic pilot.

One object of the present invention is to provide an improved device for controlling the altitude of an aircraft.

It is an other object of the present invention to provide an improved device to produce adjustable constant rate of change of altitude of an aircraft.

It is a further object of the present invention to provide an improved device for combining altitude and attitude control of aircraft.

Another object of the present invention is to provide control means for causing an airplane to climb or glide at any angle consistent with stable flight.

A further object is to provide automatic throttle control for maintaining constant air speed during level or non-level flight.

Another object of the present invention is to provide continuous correction for indicated airspeed during change of altitude, as during climb or glide.

Other objects and advantages of the present invention will become apparent as the description proceeds.

In the figures,

Fig. 1 shows a diagrammatic perspective representation of our altitude control system.

Fig. 2 shows a schematic representation of a modification of the system of Fig. 1.

Fig. 3 shows the automatic airspeed indication correction mechanism and throttle adjustment mechanism adapted for use with the system of Fig. 1.

Figs. 4–6 show modifications of the airspeed control of Fig. 3.

Referring to Fig. 1, a conventional ball, disc and cylinder type of variable speed drive 11 has its ball carriage 13 actuated from an altitude rate control knob 15, as by means of a pinion 17 and rack 19. Disc 21 of variable speed drive 11 is driven at constant speed from a constant speed motor 23, so that the speed of rotation of cylinder 25 and shaft 26 attached thereto is caused to be proportional to the setting of ball carriage 13 and hence to the setting of altitude rate control 15. Cylinder 25 and shaft 26 operate to drive one element 27 of a controlling device or pneumatic pick-off unit 29 as by way of gear 31, differential 33 and pinion 35 engaging a gear 37 fastened to the pick-off housing 27.

Pick-off 29 is shown as comprising a pick-off housing 27 having opposed air ports 28, 30 connected to pneumatic ducts 39 and 41. Ducts 39 and 41 cooperate with a cut-off member 43, which is actuated from any suitable type of altimeter 45. It will be clear that any suitable type of follow-up mechanism or torque amplifier may be used between altimeter 45 and sensitive element 43 of pick-off 29, if necessary or desirable. Housing 27 of pick-off 29 is provided with air under pressure through a duct 47. Ducts 39 and 41 terminate in nozzles 49 and 51, respectively, which act oppositely upon the vanes of an air turbine 53. Valves 48, 50 may cut off ducts 39, 41 when desired. The system is adjusted in such fashion that when cut-off member 43 is symmetrically positioned with respect to ports 28 and 30, the air jets from nozzles 49 and 51 have equal and opposite effect upon turbine 53, which therefore remains stationary.

Upon relative motion between cut-off member 43 and housing 27 in one sense or the other, the effects of nozzles 49 and 51 are rendered unbalanced in a corresponding direction so long as this unbalance exists. Turbine 53 is connected as by way of a gear 55 and a differential 57 to a worm 59, engaging a worm wheel 61 fastened to a second pick-off housing 63 which may be similar in all respects to pick-off 29. The cut-off member 65 of this second pick-off is connected directly to the pitch axis of a conventional gyro vertical 67 shown as mounted in two gimbal rings 69 and 71, the outer gimbal ring 69 being fixed to the craft. Housing 63 of this second pick-off is connected to a source of reduced pressure through duct line 73. Its opposed ports are connected to ducts 75 and 77 and thereby to the opposite sides of a pneumatic diaphragm 79. When cut-off member 65 is centralized within housing 63, equal pressures occur on each side of pneumatic diaphragm 79 producing no motion of this diaphragm.

However, upon unbalance of these pressures caused by relative motion of cut-off member 65 and housing 63 in one sense or the other, the diaphragm 79 is caused to actuate a servo valve 81 in a corresponding sense, and thereby operates a servo motor 83 which moves the elevators 85 as by cables 87. The motion of cables 87 and elevator 85 is transmitted as by cable 91 to the third member of differential 57 and operates to reposition housing 63 with respect to cut off member 65 and thereby provide the repeat-back of this pneumatic-hydraulic servo system.

With flight turbine 53 stationary, pick-off 63, gyro vertical 67 and their associated servo system operate to maintain the craft in constant attitude with respect to the pitch axis, since any change of attitude of the craft will result in motion of housing 63 with respect to cut-off member 65 and will thereby actuate elevator 85 to restore the craft to its predetermined attitude. A similar system may be used to control attitude in roll or turn.

Similarly, any change in altitude of the craft will cause cut-off member 43 to move relative to pick-off housing 27, thereby providing unbalance between the air jets of nozzles 49, 51 and rotating turbine 53 displacing housing 63 with respect to cut-off member 65. This actuates elevators 85 to restore the craft to its predetermined altitude, as described.

In this manner, it will be clear that we have provided an automatic control for aircraft which will maintain the craft at constant altitude and predetermined attitude with respect to the pitch axis. If it is desired to change the altitude at which the craft is flying, altitude control 93 may be actuated, which operates through pinion 95 and differential 33 to displace pick-off housing 27 by a corresponding amount with respect to cut-off member 43. This action causes operation of the elevators 85 in the manner just described until the altitude of the craft has changed by an amount such that altimeter 45 has repositioned cut-off member 43 symmetrically with respect to housing 27.

While we have described the foregoing pick-offs or signal generators as having a housing and sensitive element of the differential air flow type, it will be understood that equivalent two-part electrical or other pick-offs may be employed, such as described hereinafter in connection with Figs. 3 and 6, within the scope of the appended claims.

If a constant rate of change of altitude is desired, altitude rate control 15 may be actuated to rotate housing 27 of pick-off 29 at a constant rate, adjusted in accordance with the setting of ball carriage 13. In this way, the craft is caused to fly in such manner that cut-off member 43 will follow the motion of pick-off housing 27, which means that the altitude of the craft must change at a rate corresponding to the motion of the pick-off housing 27. In this manner an adjustable constant rate of climb or glide of the aircraft may be obtained.

Fig. 2 shows a modified method of providing the constant rotation of pick-off housing 27 necessary to produce the constant rate of climb or glide. In this instance, the control is electrical, and may be had from a remote point, thereby embodying the further advantage of a remotely actuated control. Here, shaft 26, instead of being actuated by the variable speed mechanism 11 of Fig. 1, is now driven by a variable speed motor 101. Motor 101 in this instance is shown as being of the direct current shunt type having an armature 103 and a field winding 105.

Altitude rate control 15 now operates the variable arm 107 of a potentiometer 109 whose fixed center-tap 111 is connected to one terminal 113 of armature 103 through a variable resistor 115. The other terminal 117 of armature 103 is connected to the variable arm 107 of potentiometer 109 which is insulated from control 15. In this manner the volt drop existing across resistor 107 plus that between tap 111 and arm 107 of potentiometer 109 is impressed across armature 103.

Altitude rate control 15 also actuates a cam 119 which cooperates with two sets of switching contacts 121, 123 and 125, 127. Switching contacts 121 and 123 are connected in parallel, and are adapted to connect the circuit of Fig. 1 to the direct current source 129 upon the rotation of cam 119 in either direction from its central position, in which it is shown in Fig. 2. Contacts 121 and 123 thereby act as a power switch for the control system.

Field winding 105 has one terminal connected directly to one terminal of the direct current power source, indicated at 129, and the other field winding terminal is connected to the other power source terminal, upon actuation of either contacts 121 or 123. It will be clear therefore that field winding 105 is connected directly across the power line with fixed polarity whenever altitude control 15 is moved from its neutral position.

Contacts 125 and 127 operate to connect armature 103 to power source 129 through suitable variable resistors to be described, in such manner that for one sense of actuation of control 15 a predetermined polarity of voltage is impressed on armature 103 while for the opposite sense of rotation of control 15, opposite polarity is impressed upon armature 103. Thus, armature terminal 113 will be connected to the negative side of the direct current source 129 upon closing of contacts 127. At the same time, thereby, center-tap terminal 111 of potentiometer 109 is connected to negative direct current source through resistor 115. The right-hand terminal 131 of potentiometer 109 will then be connected through a rheostat 135 and contacts 123 to the positive side of the direct current source 129. The left-hand half of potentiometer 109 is effectively short-circuited since the left-hand terminal 133 is connected permanently to the negative side of the direct current source 129 through variable rheostat 137.

Hence, it will be clear that closing of contacts 127 and 123 operate to pass current through the series circuit comprising rheostat 115, the right-hand half of potentiometer 109 and rheostat 135, the potential gradient produced having such a polarity that terminal 111 is negative with respect to the terminal 131 of potentiometer 109.

With control 15 in the central position shown, it will be clear that zero voltage exists between points 111 and 107 and hence the only voltage across armature 103 will be that across rheostat 115, whose setting therefore acts to determine the minimum voltage across armature 103 and hence the minimum speed at which motor 101 will rotate. Operation of altitude rate control 15 in a clockwise direction will operate to increase the voltage across armature 103 and will therefore provide increased speed output of shaft 26. Maximum speed output is derived when variable arm 107 contacts terminal 131 of potentiometer 109, in which case, the voltage across armature 103 will be the volt drop across rheostat 115 plus the entire volt drop of the right-hand half of potentiometer 109. This provides the maximum of voltage across armature 103 and hence the maximum speed output of shaft 26. It will be clear that this maximum speed may be adjusted by adjustment of rheostat 135, which effectively determines the voltage gradient in potentiometer 109 as well as the volt drop across rheostat 115.

For this condition, that is, clockwise rotation of control 15 from its neutral position, the left-hand half of potentiometer 109 is completely ineffective, being effectively short-circuited. However, upon operation of control 15 to the left of its neutral position, cam 119 will then operate to connect terminal 113 of armature 103 to the positive side of the direct current source through contacts 125 and 121 in series. Hence, the polarity of the voltage across armature 103 is reversed, and in this instance, the left-hand half of potentiometer 109 becomes energized, the right-hand half being effectively short-circuited. Terminal 111 now has positive polarity with respect to variable arm 107. In the same manner as before rotation of the control in a counter-clockwise sense will adjust the speed of the motor 101, the minimum speed being determined by rheostat 115, the maximum speed by rheostat 137 and intermediate speeds being proportional to the setting of altitude control 15. Hence, the device of Fig. 2 provides effectively an electrically controlled variable speed drive and it will be clear that this device may be used to replace the variable speed drive 11 shown in Fig. 1, having the advantage over the showing in Fig. 1 of permitting entirely remote control, since motor 101 may be located remotely from the control potentiometer and cam switch, being connected thereto only by suitable wires.

Referring again to Fig. 1, during the usual operation of the apparatus, pick-off 29 produces a signal when the craft departs from a desired altitude due to movement of the sensitive element 43. The craft then moves to the desired altitude through operation of the autopilot so that the signal of the pick-off 29 is restored to zero. Hence, within the limits of accuracy of the apparatus, the set angular position of the pick-off housing 27 is representative of the altitude of the craft. Geared to pick-off housing 27 as by means of gears 35 and 36 is a remote position transmitter 38 which may be of the usual "selsyn" or "autosyn" type having the usual three output wires marked A. These wires A are connected by a suitable cable to the repeater motor 139 shown in Fig. 3, which operates by means of gear 141, differential 143, shaft 144 and gear 145 to reposition a graduated ring 147 cooperating with an airspeed meter 149 connected as by a duct line 151 to the Pitot tube or other suitable device for airspeed indication.

As is well known, in such types of airspeed indicator the accuracy of calibration is highest only for a particular altitude, that is, for a particular air density. As altitude changes and air density changes accordingly, the airspeed meter calibrations are no longer fully accurate. By the present device, the readings taken from airspeed meter 149 are corrected proportionately to altitude and hence the error due to change in altitude and consequent change in air density is substantially removed.

Under some conditions of operation, it is desirable that the craft maintain constant airspeed regardless of whether it is flying at constant altitude or changing altitude. However, for a constant rate of climb, in order to maintain the same airspeed, it is necessary to provide more power to the engines. In the same manner, with constant rate of glide, less power is required to maintain the same airspeed. Accordingly, it is desirable to control the power applied to the aircraft engine or engines in accordance with airspeed. This is done in the present device by automatically controlling the intake manifold throttle 153 in accordance with airspeed indications. Thus, airspeed indicator 149 actuates one element, the rotor, of a remote position transmitter 155, whose stator or housing is driven in synchronism with graduated ring 147 as by means of a gear 157 fixed to shaft 144. Accordingly, the actual airspeed reading corrected for altitude in the manner just described will correspond exactly to the relative displacement between the rotor and stator of transmitter 155. Accordingly, the output voltages appearing across wires 159 will correspond to the corrected airspeed. These voltages are applied to the repeater motor 161 which thereby positions its rotor and output shaft 163 in accordance with the corrected airspeed. The throttle 153 may be connected directly to output shaft 163 and thereby control the amount of fuel applied to the aircraft engines proportionately to airspeed, so that constant air speed is maintained independently of change in altitude.

If it is desired to make a manual change of throttle position, this may be done by a control 165 which rotates the housing or stator of repeater 161, as by means of a gear 167 and thereby causes output shaft 163 to rotate through a corresponding angle.

If it is desired to set airspeed meter 149 at a certain speed to be maintained in the manner just described, this may be done by means of a control 169 which operates the graduated scale 147 of airspeed indicator 149 through the third member of differential 143. In this way, it is possible to maintain an adjustable constant airspeed during level flight or climb or glide.

Fig. 4 shows a modified type of throttle control similar to that shown in Fig. 3. Thus, the output of transmitter 155 of Fig. 3 appearing as voltages across wires 159 is applied to a signal generator 171 which may comprise a "selsyn" or "autosyn"-type instrument similar in construction to transmitter 155. Signal generator 171 is thereby adapted to produce across its output wires 173 a reversible-phase variable magnitude alternating signal voltage corresponding in magnitude and phase to the magnitude and sense of relative displacement between shaft 163 of signal generator 171 and the zero position of transmitter 155. This signal voltage is fed to a suitable rate amplifier 175, which may be similar to that shown in application No. 448,040 for Electrical control system, filed June 22, 1942, in the name of Halpert, Frische, Bird and Esval. The output of amplifier 175 controls a suitable motor 177 connected to rotate shaft 163 and the rotor of the signal generator 171 back into correspondence with transmitter 155. Throttle 153 in the intake manifold 156 of the engine of the craft is directly actuated by shaft 163.

Since the output voltages of transmitter 155 correspond to the corrected airspeed of the craft compensated for changes in altitude, as discussed above, it will be clear that throttle 153 is actuated strictly in accordance with the actual airspeed of the craft. By suitably choosing the relative magnitudes of the signals and the gear ratios involved, it is thus possible to maintain the airspeed constant despite changes in altitude. Rate amplifier 175 prevents hunting about the set air speed.

It will be understood that it is not necessary to use the exact type of follow-up control illustrated in Fig. 4. Thus, instead of motor 177, a pneumatic or hydraulic type of actuating device may be used under the control of the output of signal generator 171.

Fig. 5 shows a further modification of this portion of the system. Here the airspeed correction appearing on shaft 144 of Fig. 3 is connected to one member of a differential 179. A second member of differential 179 is actuated directly from the airspeed meter 149, as by way of shaft 154 and pinion 181. As a result, the third member of differential 179 is actuated by the corrected or compensated airspeed, and serves to position a sensitive follow-up member 183 in accordance with this compensated airspeed. Sensitive member 183 cooperates with a rotatable housing 185 carrying a pair of air ports 187 and 189 having ducts 188 and 190 respectively connected thereto. Housing 185 is connected to a suitable source of sub-atmospheric pressure as by way of duct 191.

It will be clear that with sensitive element 183 symmetrically located with respect to ports 187 and 189, that equal pressures will be produced in ducts 188 and 190, resulting in zero displacement of pneumatic diaphragm 193. Upon unbalance of sensitive element 183 in one sense or the other with respect to ports 187 and 189, a differential pneumatic pressure having corresponding sense is produced in ducts 188 and 190 producing a corresponding direction of motion of diaphragm 193 and its output shaft 195. Shaft 195 controls a suitable valve 197 and a hydraulic servo motor 199 similar to those shown in Fig. 1, and thereby serves to actuate the throttle 153 in the intake manifold 156, as by way of rack and pinion arrangement 201 and shaft 163. Shaft 163 also serves to reposition rotatable housing 185 as by means of a pulley 203 and a cable 205 and thereby provides the repeat-back for this remote positioning system. In this way also, throttle 153 is positioned in accordance with the corrected airspeed and serves to maintain constant craft air speed despite changes in altitude.

Fig. 6 shows a further modification of the systems just described. The manifold pressure produced in intake manifold 156 is conducted by a duct 207 to a suitable pressure indicator 209, which serves to position the rotor of a signal generator 211 similar to that described above. The stator winding of the signal generator 211 is energized from the output wires 159 of transmitter 155 of Fig. 3. Accordingly, the reversible phase variable magnitude output signal voltage appearing across output wires 213 of signal generator 211 corresponds to lack of correspondence between the corrected airspeed and the manifold pressure. This signal is fed through a suitable rate amplifier 215 similar to that shown in Fig. 4, to a motor 217, which serves to reposition throttle 153 by means of its output shaft 163. In this way, the intake manifold pressure is adjusted and the craft will change its speed until the pressure and compensated airspeed are once more in correspondence, which relationship they will maintain automatically. In this way also, constant airspeed may be maintained.

It will be clear here also that any suitable type of positional control may be used to control throttle 153 by a signal indicating lack of correspondence between manifold pressure and airspeed.

The use of rate amplifiers 215 insures close control of airspeed without causing hunting about the average airspeed. The type of control shown in Fig. 6 also has the advantage that it is substantially independent of altitude, since a particular manifold pressure will produce only one airspeed at any particular altitude.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described our invention, what we claim and desire to secure by Letters Patent is:

1. An automatic pilot for aircraft comprising a gyro-vertical having a pitch axis, pick-off means, including a sensitive element connected to said pitch axis and also including a housing rotatably mounted on said craft, for producing a differential pneumatic pressure signal corresponding to the relative displacement between said element and said housing, means for controlling the attitude of said craft in pitch by said signal, to thereby reduce said signal by returning said housing to correspondence with said element, air turbine motive means for rotating said housing, an altimeter, further pick-off means, including a further sensitive element connected to be actuated by said altimeter and also including a further rotatable housing, for producing a second differential pneumatic pressure signal corresponding to the relative displacement between said further sensitive element and said further housing, means for operating said motive means by said second signal, and means for rotating said further housing at an adjustable constant rate, whereby a corresponding constant rate of change of altitude of said craft is effected.

2. An automatic pilot for aircraft comprising a gyro-vertical, pick-off means, including a sensitive element connected to be actuated by said gyro-vertical and also including a housing movably mounted on said craft, for producing a signal corresponding to relative displacement between said element and said housing, means for controlling the attitude of said shaft by said signal, to thereby reduce said signal by returning said housing into correspondence with said element, motive means for moving said housing, an altimeter, further pick-off means, including a further sensitive element connected to be actuated by said altimeter and also including a further movable housing, for producing a second signal corresponding to the relative displacement between said further sensitive element and said further housing, means for operating said motive means by said second signal, and means for moving said further housing at an adjustable constant rate, whereby a corresponding constant rate of change of altitude of said craft is effected.

3. An automatic pilot for aircraft comprising means, including a pick-off having a sensitive element and also having a housing rotatably mounted on said craft, for producing a signal corresponding to relative displacement between the attitude of said craft and a desired attitude of said craft, means for controlling the attitude of said craft by said signal to reduce said displacement, motive means for rotating said housing to thereby change said desired attitude, an altimeter, means, including a further pick-off having a further sensitive element connected to be actuated by said altimeter and also having a further rotatable housing, for producing a second signal corresponding to the relative displacement between said further sensitive element and said further housing, means for operating said motive means by said second signal, and means for rotating said further housing at an adjustable constant rate, whereby a corresponding constant rate of change of altitude of said craft is effected.

4. An automatic pilot for aircraft as in claim 2, further including means for maintaining the air speed of said craft during said change of altitude, said last means including an air speed meter, means actuated by said further housing for compensating the indications of said meter for change in altitude, and means for controlling the engine throttle of said craft in accordance with said corrected air speed indications so as to maintain constant air speed.

5. An automatic pilot for aircraft as in claim 3, further including an air speed meter, and means actuated by said further housing for compensating the indications of said meter for change in altitude.

6. In an aircraft elevator controlling automatic pilot, signal producing means for controlling said pilot having two movably mounted, relatively displaceable elements, an altimeter operatively connected to one of the elements of said signal producing means, a differential having two inputs and an output, means operatively connecting the output of said differential and the other of the elements of said signal producing means, means operatively connected to one of the inputs of said differential for positioning said other element of said producing means in accordance to a desired altitude, variable speed motive means operatively connected to the other input of said differential, and means for adjusting the speed of said motive means to control the rate of change of altitude of the craft.

7. An aircraft automatic pilot comprising servo means operable to control the elevators of the craft, an instrument providing a vertical reference for the craft, a pick off at said instrument having two movably mounted, relatively displaceable elements one of which is controlled in accordance with the reference provided by the instrument, drive means operable to move the other of the elements of the pick off, said pick off producing a controlling signal for said elevator operating servo means, an altitude controller having two movably mounted, relatively displaceable parts, an altimeter connected to move one of the parts, variable speed motive means operatively connected to the other part of said controller, and means for adjusting said motive means to move said other part of the controller at a desired speed, said controller producing an operating signal for said drive means to thereby regulate the rate of change of altitude of the craft.

8. An aircraft automatic pilot comprising servo means operable to control the elevators of the craft, an instrument providing a vertical reference for the craft, a pick off at said instrument having two movably mounted, relatively displaceable elements one of which is controlled in accordance with the reference provided by the instrument, drive means operable to move the other of the elements of the pick off, said pick off producing a controlling signal for said elevator operating servo means, an altitude controller having two movably mounted, relatively displaceable parts, an altimeter connected to move one of the parts, a differential having two inputs and an output, means operatively connecting the output of said differential and the other part of said controller, means operatively connected to one of the inputs of the differential for positioning said other part of the controller in accordance with a desired altitude, variable speed motive means operatively connected to the other of the inputs of said differential, and means for adjusting the speed of said motive means, said controller producing an operating signal for said drive means to thereby regulate the rate of change of altitude of the craft.

9. In an aircraft elevator controlling automatic pilot, an altimeter, a pick-off for said altimeter having two movable elements one of which is positioned in accordance with the instantaneous altitude of the craft, a member positioned in accordance with the other element of said pick-off, means for positioning said member in accordance with a desired altitude, an air speed meter having movable scale and pointer parts, and means connecting said member and one of the meter parts to correct said meter for change in altitude of the craft.

10. In an aircraft elevator controlling automatic pilot, a controlling device for the pilot having two relatively movable parts, an altimeter operatively connected to one of the parts of said device, variable speed motive means operatively connected to the other of the parts of said device, means for adjusting said motive means to move said other part of said device at a desired speed to produce a controlling signal for the pilot, an air speed meter, means for correcting said meter for changes in altitude of the craft operatively connected to the other of the parts of said device, and means for controlling the prime mover of the craft in accordance with the corrected air speed meter to maintain the air speed of the craft substantially constant.

11. In an aircraft elevator controlling automatic pilot, a controlling device for the pilot having two relatively movable parts, an altimeter operatively connected to one of the parts of said device, variable speed motive means operatively connected to the other of the parts of said device, means for adjusting said motive means to move said other part of said device at a desired speed to produce a controlling signal for the pilot, an air speed meter, and means operatively connected to the other of the parts of said device for correcting said meter for changes in altitude of the craft.

12. In air aircraft elevator controlling automatic pilot, a gyro vertical having a two-part pick-off at its pitch axis for producing an automatic pilot controlling signal to change the altitude of the craft, a second two-part pick-off producing an output for operating one of the parts of said first pick-off, an altimeter operatively connected to one of the parts of said second pick-off, variable speed motive means connected to move the other part of said second pick-off, and means for adjusting the speed of said motive means to control the rate of change of altitude of the craft.

13. In an aircraft elevator controlling automatic pilot, a first two-part pick-off producing an automatic pilot controlling signal to change the altitude of the craft, a pitch reference operatively connected to one of the parts of said first pick-off, means for modifying the signal of said first pick-off comprising a second two-part pick-off, an altimeter operatively connected to one of the parts of said second pick-off, variable speed motive means connected to move the other part of said second pick-off, and means for adjusting the speed of said motive means to control the rate of change of altitude of the craft.

CARL A. FRISCHE.
GERALD N. HANSON.

REFERENCES CITED

The following references are of record in the file of this patent:

UNITED STATES PATENTS

| Number | Name | Date |
| --- | --- | --- |
| 2,066,194 | Bates | Dec. 29, 1936 |
| 2,233,307 | Dodson | Feb. 25, 1941 |
| 2,112,965 | Koster | Apr. 5, 1938 |
| 2,207,709 | Bates | July 16, 1940 |
| 2,233,307 | Dodson | Feb. 25, 1941 |
| 2,177,244 | Ciamberlini | Oct. 24, 1939 |
| 2,251,498 | Schwien | Aug. 5, 1941 |
| 1,545,373 | Vickers | July 7, 1925 |
| 2,191,250 | Fischel | Feb. 20, 1940 |
| 2,143,140 | Carlson | Jan. 10, 1939 |
| 2,091,306 | Carlson | Aug. 31, 1937 |